United States Patent [19]

Palma

[11] 4,231,525

[45] Nov. 4, 1980

[54] ELECTROMAGNETIC FUEL INJECTOR WITH SELECTIVELY HARDENED ARMATURE

[75] Inventor: James D. Palma, Grand Rapids, Mich.

[73] Assignee: General Motors Corporation, Detroit, Mich.

[21] Appl. No.: 38,009

[22] Filed: May 10, 1979

Related U.S. Application Data

[63] Continuation-in-part of Ser. No. 941,754, Sep. 13, 1978, which is a continuation-in-part of Ser. No. 838,468, Oct. 3, 1977, abandoned.

[51] Int. Cl.[3] ......................... B05B 1/32; F16K 31/02

[52] U.S. Cl. ..................................... 239/585; 251/139

[58] Field of Search ....................... 251/139, 140, 141; 239/585, 533.3–533.12, 583

[56] References Cited

U.S. PATENT DOCUMENTS

| | | | |
|---|---|---|---|
| 3,653,630 | 4/1972 | Ritsema | 251/141 X |
| 3,731,881 | 5/1973 | Dixon et al. | 251/139 X |

*Primary Examiner*—Robert B. Reeves
*Assistant Examiner*—Gene A. Church
*Attorney, Agent, or Firm*—Arthur N. Krein

[57] ABSTRACT

An electromagnetic fuel injector has the armature of the solenoid assembly thereof journaled for axial movement on a fixed, small diameter guide pin of non-magnetic material. The armature is provided with an axial guide bore to slidably receive the guide pin and preselected surfaces of the armature including at least the internal wall defining the guide bore being of wear resistant material.

2 Claims, 3 Drawing Figures

ELECTROMAGNETIC FUEL INJECTOR WITH SELECTIVELY HARDENED ARMATURE

FIELD OF THE INVENTION

This application is a continuation-in-part of my copending application Ser. No. 941,754, field Sept. 13, 1978, which in turn was a continuation-in-part of application Ser. No. 838,468, filed Oct. 3, 1977, now abandoned.

This invention relates to electromagnetic fuel injectors and, in particular, to an armature structural arrangement in an electromagnetic fuel injector.

DESCRIPTION OF THE PRIOR ART

Various types of electromagnetic fuel injectors are known in the art. Normally such injectors contain a solenoid assembly that includes an electromagnetic coil which, when energized, is operative to effect axial movement of an armature. Normally the armature, which is operatively associated with a valve movable relative to a valve seat for controlling fuel injection, is slidably received and guided by its outer peripheral surface in a guide bore in the housing of the injector.

Such injectors normally require very close manufacturing tolerances to obtain concentricity of parts, to obtain proper stroke length of the armature/valve combination relative to the pole piece of the solenoid assembly, and to obtain other desired structural relationships effecting fuel metering, and the durability of the injector.

However, in order to provide for adequate response time of such an injector, the armature of the solenoid assembly in the injector is usually made of a suitable magnetically soft material. Magnetically soft materials are used since they provide high permeability and typically low residual magnetism. Unfortunately, such magnetically soft materials are generally also correspondingly physically soft, the materials normally being annealed for optimized magnetic properties.

Because of this, the armatures in the known prior art injectors are subject to excessive wear during extended use, as would occur in a motor vehicle fuel injection system. Such wear thus negates the previously obtained close manufacturing tolerances of the armature relative to the remaining associated elements of the injector and, accordingly, detrimentally affecting the overall operation, including the fuel metering function, of the injector.

SUMMARY OF THE INVENTION

A primary object of the present invention is to provide an improved electromagnetic fuel injector construction that advantageously utilizes a small diameter guide pin for axial alignment of a movable armature, with the armature having a wear resistant surface for sliding engagement with the guide pin.

Accordingly, another object of the invention is to provide an improved armature for use in an electromagnetic fuel injector, the armature being provided with selectively hardened wear surfaces to provide for increased operational durability of the injector.

A further object of the invention is to provide an improved electromagnetic fuel injector wherein the armature of the electromagnetic assembly of the injector has an axial bore therethrough to receive a fixed small diameter guide pin whereby the axial sliding friction of the armature is substantially reduced so as to improve the dynamic response time of the injector, with at least the bore wall surface of the armature being of a hard wear resistant material with substantially the remainder of the armature being of magnetically soft material.

Still another object of the present invention is to provide an electromagnetic fuel injector of the above type which includes features of solenoid construction, operation and arrangement, rendering it easy and inexpensive to manufacture and to calibrate for desired fuel flow, which is reliable in operation, and in other respects suitable for extended use on production motor vehicle fuel systems.

The present invention provides an electromagnetic fuel injector, the movable unit of which is defined by a spherical bearing having a flat face which is seated on the flat end face of an armature but is not otherwise secured thereto and thus can slide sideways to accommodate misalignment. The armature is spring-biased towards a valve-closed position and is drawn against the bias by current flow in the solenoid. The armature, is guided by a small diameter guide pin for axial movement. The armature, under the spring bias, locates the valve in a closed, centered position on the valve seat. The armature in accordance with the invention is provided with a hardened bore wall wear surface for sliding engagement with the guide pin. In the preferred form, the armature is also provided with hardened wear resistant surfaces at opposite ends thereof.

For a better understanding of the invention, as well as other objects and further features thereof, reference is had to the following detailed description of the invention to be read in connection with the accompanying drawings.

DESCRIPTION OF THE EMBODIMENTS

Figure 1:
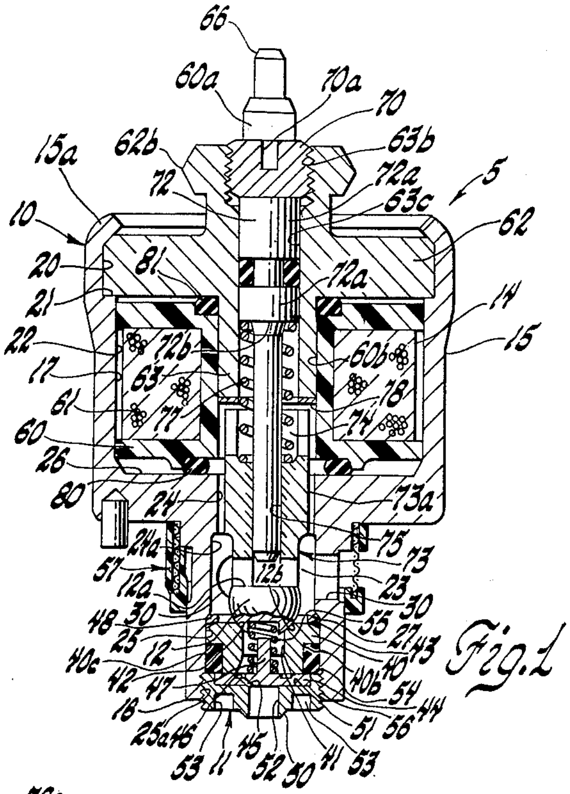
FIG. 1 is a longitudinal cross-sectional view of an exemplary embodiment of an electromagnetic fuel injector having an armature in accordance with the invention incorporated therein, the armature guide pin and valve member of the assembly being shown in elevation, but with part of the valve member broken away.

Referring now to FIG. 1, an electromagnetic fuel injector, generally designated 5 in accordance with an embodiment of the invention, includes as major components thereof a body 10, a nozzle assembly 11, a valve 12 and a solenoid assembly 14 used to control movement of the valve 12.

Referring now to FIG. 1, in the construction illustrated, the body 10, made for example of silicon core iron and which is cold formed, is of circular hollow tubular configuration and is of such external shape so as to permit direct insertion, if desired, of the injector into a socket provided for this purpose in either an intake manifold, not shown, or in the injector mechanism of a throttle body injection apparatus, not shown, for an engine.

The body 10, includes an enlarged upper solenoid case portion 15 and a lower end nozzle case portion 16 of reduced external diameter relative to portion 15. An internal cylindrical cavity 17 is formed in the body 10 by a stepped vertical bore therethrough that is substantially coaxial with the axis of the body. In the construction shown, the cavity 17 provides a cylindrical upper wall 20, a cylindrical upper intermediate wall 22, a cylindrical lower intermediate wall 24 and a cylindrical lower wall 25. Such walls 20, 22 and 24 are of progressively reduced diameters relative to the wall next above, while the lower wall 25 is of enlarged diameter relative to wall 24 for a purpose to be described. In the construction shown, the cylindrical wall 24 is of stepped diameters whereby to provide an upper portion 24 of a diameter to loosely slidably receive the large diameter portion 73*a* of an armature 73, to be described in detail hereinafter, and a lower cylindrical wall portion 24*a* of a diameter greater than the wall portion 24. Walls 20 and 22 are interconnected by a flat shoulder 21. Walls 22 and 24 are interconnected by a flat shoulder 26. Walls 24 and 25, in the construction shown in FIG. 1, are interconnected by a beveled shoulder 27.

Wall portion 24*a* defines the outer peripheral extent of a fuel chamber 23, to be described in greater detail hereinafter, within the body 10. The body 10 in the construction shown in FIG. 1, is preferably provided with three, circumferentially equally spaced apart, radial port passages 30 in the nozzle case portion 15 thereof which open through the wall 24*a* to effect flow communication with the fuel chamber 23.

The injection nozzle assembly 11 mounted in the lower nozzle case portion 16 of body 10 includes, in succession starting from the upper end with reference to FIG. 1, a seat element 40, a swirl director plate 44 and a spray tip 50. The seat element 40, director plate 44 and spray tip 50 are stacked face to face and are positioned in the lower cavity formed by the cylindrical wall 25 in the lower nozzle case portion 16 in a manner to be described.

In the embodiment shown, the seat element 40 is provided with a central axial discharge passage 41 therethrough, this passage being tapered outward at its lower end whereby its outlet end diameter is substantially equal to the outside diameter of the annular groove 46 provided in the upper surface of the swirl director plate 44. The seat element 40 is also provided with a conical valve seat 42 on its upper surface 43, the valve seat being formed concentric with and encircling the upper end of the discharge passage 41. The upper surface 43 of the seat element 40, in the embodiment illustrated, is downwardly tapered adjacent to its outer peripheral edge. This tapered surface is formed at an angle of, for example, 10° to 11° from the horizontal so as to provide an abutment shoulder for the outer peripheral annular edge on one side of an abutment washer 48 for a purpose to be described.

The swirl director plate 44 is provided with a plurality of circumferentially, equally spaced apart, inclined and axially extending director passages 45. Preferably, six such passages are used, although only one such passage is shown in FIG. 1. These director passage 45, of predetermined equal diameters, extend at one end downward from an annular groove 46 provided on the upper surface of the swirl director plate 44. The groove 46, as shown, is positioned so as to encircle a boss 47 formed integral with the director plate to extend vertically upward from the upper surface of the main body portion thereof. The boss 47 thus extends vertically upward loosely into the discharge passage 41 so as to terminate at a predetermined location, a location that is axially spaced from the lower end of the valve element 12 when it is in its seated position shown.

The spray tip 50 is provided with a straight through passage 52 which serves as a combined swirl chamber-spray orifice passage for the discharge of fuel from this nozzle assembly. As shown the spray tip 50 is provided at its upper end with a recessed circular groove 51 of a size so as to receive the main body portion of the swirl director plate 44 therein whereby to locate this element substantially coaxial with the axis of the swirl chamber-spray orifice passage 52.

In the construction shown, the outer peripheral surface of the spray tip 50 is provided with external threads 56 for mating engagement with the internal threads 25*a* provided in the lower end of the body 10. Preferably the threads 25*a* and 56 are of suitable fine pitch whereby to limit axial movement of the spray tip, as desired, for each full revolution of the spray tip relative to body 10 as desired. The lower face of the spray tip 50 is provided, for example, with at least a pair of diametrically opposed blind bores 53 of a size so as to slidably recieve the lugs of a spanner wrench, not shown, whereby rotational torque may be applied to the spray tip 50 during assembly and axial adjustment of this element in the body 10.

With the structural arrangement the stroke of the injector can be accurately adjusted by the use of a collapsible abutment member between the upper surface of the valve seat element 40 and the shoulder 27 of the body 10. The collapsible abutment member, in the construction shown, is in the form of a flat spring abutment washer 48 of a suitable outside diameter to be slidably received within the lower wall 25 so as to abut against shoulder 27 located a predetermined axial distance from the lower flat end of the core 63 of the solenoid assembly to be described hereinafter. The washer 48 when first installed would be flat. As thus assembled, the upper outer peripheral edge of the washer 48 would engage against the outer radial portion of the shoulder 27 and its radial inner edge on the opposite side of the washer would abut against the upper tapered surface 43 of the seat element 40. With the washer 48, seat element 40, swirl director plate 44, and the spray tip 50 thus assembled with the spray tip 50 in threaded engagement with internal threads 25*a*, these elements can then be axially adjustably positioned upward within the lower end of the body 10.

After these elements are thus assembled, in actual use during calibration of the injector, adjustment of the injector stroke is made while the injector is still flowing calibration fluid on a continuous basis. During flow of the calibration fluid, an operator, through the use of a spanner wrench, not shown, can rotate the spray tip 50 in a direction whereby to effect axial displacement thereof in an upward direction with reference to FIG. 1. As the nozzle assembly is moved axially upward by rotation of the spray tip 50, the seat element 40 thus moved would cause the spring washer 48 to deflect or bend into a truncated cone shape, the position shown in FIG. 1, to thereby in effect forcibly move the lower abutment surface of the washer 48 upward relative to the fixed shoulder 27 until the desired flow rate is achieved to thereby axially position the valve seat 42 of the seat element 40 to thus establish the proper stroke length of the armature/valve for that injector. The spray tip 50 is then secured against rotation relative to the body 10 by any suitable means such as, for example, by laser beam welding at the threaded inner face of these elements.

With the above described arrangement, the effective flow orifice of the valve and valve seat interface as generated by injector stroke is controlled directly within very close tolerances by an actual flow measurement rather than by a mechanical displacement gauge measurement and this is accomplished after assembly of the injector. Also, with this arrangement, the necessity of gauging and of selective fitting of various components is eliminated. In addition, less injector rework after assembly would be required since means are provided to vary the stroke as desired.

An O-ring seal 54 is operatively positioned to effect a seal between the seat element 40 and the wall 25. In the construction shown in FIG. 1, the seat element 40 is provided with an external reduced diameter wall **40*b* at its lower end to receive the O-ring seal 54. The ring seal 54 is retained axially in one direction by the flat shoulder 40*c* of the seat element 40 and in the opposite direction by its abutment against the upper surface of director plate 44**.

Flow through the discharge passage 41 in seat element 40 is controlled by the valve 12 which is loosely received within the fuel chamber 23. This valve member is movable vertically between a closed position at which it is seated against the valve seat 42 and an open position at which it is unseated, from the valve seat 42, as described in greater detail hereinafter. The valve 12 is of a truncated ball-like configuration to provide a semi-spherical seating surface for engagement against the valve seat 42. As shown in FIG. 1, the valve 12 is made in the form of a ball which is truncated at one end whereby to provide a flat surface **12*a* on its upper side for a purpose to be described, the lower seating surface portion 12*b* thereof being of semi-spherical configuration whereby to be self-centering when engaging the conical valve seat 42. Valve 12 may be made of any suitable hard material which may be either a magnetic or non-magnetic material. For durability, as used in a particular fuel injection system, the valve 12** is made of SAE 51440 stainless steel and is suitably hardened.

To aid in unseating of the valve 12 from the valve seat 42 and to hold this valve in abutment against the lower end of its associated armature 73 when in its open position during periods of injection, a compression valve spring 55 is positioned on the lower side of the valve so as to be loosely received in the discharge passage 41 of seat element 40. As shown in FIG. 1, the valve spring 55 is positioned to abut at one end, its lower end with reference to FIG. 1, against the upper surface of director plate 44 and to abut at its opposite end against the lower semi-spherical portion of valve 12 opposite the flat surface **12*a*. Normal seating and actuation of the valve 12 is controlled by the solenoid assembly 14** in a manner to be described.

To effect filtering of the fuel being supplied to the injector 5 prior to its entry into the fuel chamber 23, there is provided a fuel filter assembly, generally designated 57. The fuel filter assembly 57 is adapted to be suitably secured, as for example by predetermined press fit, to the body 10 in position to encircle the radial port passages 30 therethrough. Although any suitable fuel filter assembly 57 can be used, in the embodiment illustrated, the fuel filter assembly 57 is of the type disclosed in Applicant's above-identified co-pending application Ser. No. 941,754, the disclosure of which is incorporated herein by reference thereto.

The solenoid assembly 14 of the injector 5 includes a tubular coil bobbin 60 supporting a wound wire coil 61. Bobbin 60 is positioned in the body 10 between the shoulder 26 thereof and the lower surface of a circular pole piece 62 that is slidably received at its outer peripheral edge within the wall 20. Pole piece 62 is axially retained within body 10 as by being sandwiched between the shoulder 21 and the radially inward spun over upper rim **15*a* of the body. Seals 80 and 81 are used to effect a seal between the shoulder 26 and the lower end of bobbin 60 and between the upper end of bobbin 60 and the lower surface of pole piece 62**.

Formed integral with the pole piece 62 and extending centrally downward therefrom is a tubular core 63. Core 63 is of a suitable external diameter so as to be slidably received in the bore aperture **60*b* that extends coaxially through the bobbin 60. The core 63, as formed integral with the pole piece 62, is of a predetermined axial extent so as to extend a predetermined axial distance into the bobbin 60 in axial spaced apart relation to the shoulder 27. The pole piece 62, in the construction illustrated, is also provided with an upstanding central boss 62*b*** that is radially enlarged at its upper end for a purpose which will become apparent.

Pole piece 62 and its integral core 63 are formed with a central through stepped bore **63*c*. The cylindrical annular wall, defined by the bore 63*c* is provided at its upper end within the enlarged portion of boss 62*b*, with internal thread 63*b*. A spring adjusting screw 70, having a tool receiving slot 70*a*, for example, at its upper end, is adjustably threadedly received by the thread 63*b***.

Pole piece 62 is also provided with a pair of diametrically opposed circular through slots, not shown, that are located radially outward of boss **62*b* so as to receive the upright circular studs 60*a* of bobbin 60, only one such stud 60*a* being shown in FIG. 1. Each such stud 60*a* has one end of a terminal lead 66 extendinb axially therethrough, the opposite end, not shown, of each such lead being connected, as by solder, to a terminal end of coil 61. The terminal end, not shown, of coil 61, the studs 60*a*, and of the through slots, not shown, in the pole piece 62 are located diametrically opposite each other whereby to enhance the formation of a more uniform and symmetrical magnetic field upon energization of the coil 61 to effect movement of the cylindrical armature 73 upward without any significant side force thereon to thereby eliminate tilting of the armature. Such tilting would tend to increase the sliding friction of the armature 73 on its armature guide pin 72**.

The cylindrical armature guide pin 72, made of suitable non-magnetic material, is provided with axially spaced apart enlarged diameter upper end portions whereby to define axially spaced apart cylindrical lands **72*a* that are of a diameter whereby they are guidingly received in bore 63*c* of the core 63 so as to effect coaxial alignment of the armature guide pin 72 within this bore and thus within the body 10. The enlarged upper end of the armature guide pin 72 is positioned to abut against the lower surface of the spring adjusting screw 70 while the reduced diameter opposite end of the armature guide pin 72 extends axially downward from the core 63, a suitable distance to serve as a guide for aligned axial movement of the armature 73 thereon. A suitable seal, such as an O-ring seal 54, is sealingly engaged against a wall portion of the core 63 defining bore 63*c* and a reduced diameter portion of the armature guide pin 72 between the lands 72*a***.

The armature 73 of the solenoid assembly 14, as shown in the Figures, is of a cylindrical tubular construction with an upper portion of an outside diameter whereby this armature is loosely slidably received within the lower intermediate wall 24 of the body and in the lower guide portion of the bore aperture 60*b* of bobbin 60. The armature 73 is formed with a stepped central bore therethrough to provide an upper spring cavity 74 portion and a lower pin guide bore 75 portion of a preselected inside diameter whereby to slidably receive the small diameter end portion of the armature guide pin 72. As previously described, the armature is guided for its axial movement by the armature guide pin 72. The armature 73 at its lower end is provided with a central radial extending through narrow slot 76 formed at right angles to the axis of the armature. At its opposite or upper end, the armature 73 is also provided with at least one right angle, through narrow slot 76*a*, two such slots being shown in the armatures illustrated.

A shim 78 of washer-like configuration, made of suitable non-magnetic material and of a predetermined thickness, is positioned axially between the lower end of the core 63 and the upper end of the armature 73, as by having this shim abutting against the lower surface of the core 63 for a purpose to be described next hereinafter.

With this arrangement, the armature 73 is thus slidably positioned for vertical axial movement between a lowered position, as shown, at which it abuts against the upper flat surface 12*a* of valve 12 to force the valve into seating engagement with the valve seat 42 and a raised position at which the upper end of the armature 73 abuts against the lower end of the core 63 with the shim 78 sandwiched therebetween. When the armature 73 is in its lowered position, an air gap is established between the lower end of the core 63 and the upper end of the armature 73. This air gap can be preselected as desired.

In a particular construction of the injector 5 for use in a specific fuel injection system, the air gap or axial extent between the lower flat end of the core 63 and the upper flat end of the armature 73, when the latter is in its lowered position shown, was approximately 0.006 inch. In this construction, the shim 78 was 0.002 inch thick. thus, although the air gap was approximately 0.006 inch in axial length, with the shim 78 positioned in this air gap, the actual axial extent of movement of the armature upon energization of the solenoid was approximately 0.004 inch.

Armature 73 is normally biased to its lowered position with the valve 12 seated against the valve seat 42 by means of a coil return spring 77 of a predetermined force value greater than that of the valve spring 55. Spring 77 is positioned in the spring cavity 74 and in the bore of core 63. The spring 77 is thus positioned to encircle the lower reduced diameter end of the guide pin 72 with one end of the spring positioned to abut against a radial shoulder 73*c* at the bottom of the spring cavity 74 and, at its opposite end, the spring 77 abuts against a radial shoulder 72*b* of the armature guide pin 72 whereby to bias this pin into abutment against the spring adjusting screw 70.

As an example, in a particular construction, the force of the return spring 77, as installed, was substantially 7.8 N (Newtons) while the nominal force for the valve spring 55 was 2.78 N. These forces are substantially the same in both the valve-open and valve-closed conditions.

Applicant has discovered that improved dynamic or "pulse-to-pulse" flow repeatably of an electromagnetic fuel injector is obtained if a ball-like valve flow-control member thereof is centered at initial assembly and then remains essentially centered during subsequent injector operation. If this does not occur, the ball-type valve has a tendency to bounce side-to-side as it positions itself relative to the associated valve seat at each injector closure.

Now in accordance with one feature of the invention, rather than having the outer peripheral surfaces of the armature in sliding guided engagement with an integral bore wall of the injector body as common in prior art injectors, the armature 73 is guided during reciprocating movement by means of the guide pin 72 in the manner described.

Now if, as normal, the armature 73 is made of magnetically soft material, for example an SAE 1002–1010 steel, this material, such as the low carbon steel identified above, is also a physically soft material. An armature thus made, like those in the prior art, would wear during extended usage, in particular at the wear guide surface as defined by guide bore 75 thereof and also the opposed faces thereof, especially the upper end surface with reference to FIG. 1, due to the repeated impact of this surface with the lower end face of the core 63 of the pole piece 62.

Since it is the outer peripheral surface of the armature adjacent to its upper end which preferably should be magnetically soft due to its position in the flux path generated upon energization of the solenoid coil 61, prior art armatures were not normally provided with an outer wear resistant surface, because if such a wear resistant outer peripheral surface was used, this hard material would also be magnetically hard and would thus provide some adverse magnetic characteristics to the armature. For example, case hardening of the outer peripheral surface of a conventional armature would result in the formation of a thin shell of magnetically "hard" (permanently magnetic) material on the outer peripheral wear surface. This outer thin layer of "hard" material would then increase the reluctance (resistance to passage of flux) within the magnetic circuit of the solenoid assembly using this type armature.

However, in accordance with the invention, since the armature 73 is provided with a guide bore 75 slidably receiving the lower end of the guide pin 72, it is now possible to provide the wall defining this guide bore with a wear resistant surface without adversely affecting the normal magnetic characteristics of the armature. Thus it is now possible to provide hardened wear resistant surfaces on selected portions of the armature, and, in particular on those surfaces locations on the armature 73 that are not within the magnetic circuit of the solenoid 14 but which are subject to wear during extended usage.

Thus for example, with the armature 73 and guide pin 72 arrangement shown, the armature 73 can be selectively case hardened, that is, only those surfaces need be case hardened which require wear resistance or which are not within the magnetic circuit of the solenoid 14. This case hardening can be accomplished, for example, by the two different methods described hereinafter.

Figure 2:
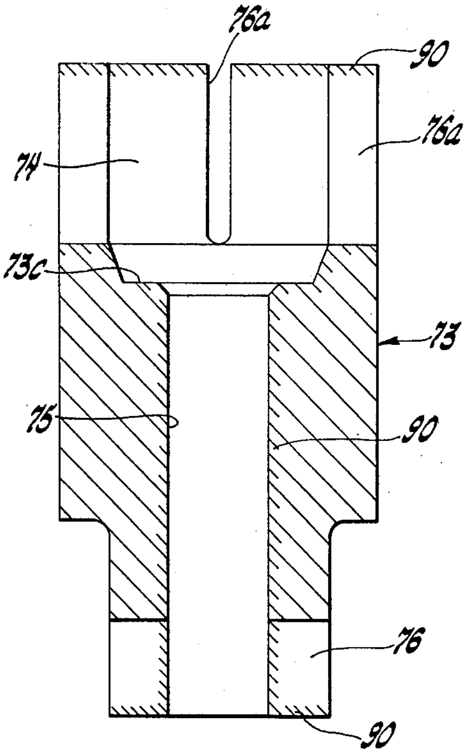
FIG. 2 is an enlarged cross-sectional view of the armature, per se, of the injector of FIG. 1; and, FIG. 3 is an enlarged cross-section view of an alternate embodiment armature for use in the injector of FIG. 1.

In the first method, a copper plating can be placed on all exposed surfaces of the armature 73 in a conventional manner well known in the plating art. Thereafter the copper plating is suitably removed, as by machining, from selected surfaces of the armature where hardness is required. In the embodiment of the armature 73 shown in FIG. 2 the copper plating would have been removed from the internal wall surface defining the guide bore 75 and also from opposed opposite end surfaces of the armature. After the copper plating has been removed, the material described above of the armature is then subjected to a conventional carburize or carbonitride case hardening process. The copper acts as a "stop off" material during the case hardening process. After the case hardening process has been completed the remaining copper plating is removed to thus provide the armature 73 structure, shown in FIG. 2, which has the hardened wear resistant surfaces 90 formed on the cylindrical inner wall of guide bore 75 and also at the opposite end surfaces of the armature in the embodiment illustrated. For a particular application, the armature 73 had a carbonitride treatment to provide for a 0.004–0.007 inch finish case depth to provide the wear resistant surfaces 90.

In a preferred method, the armature 73 is originally fabricated with oversized dimensions for those surface areas which do not require or need wear resistance. For example, at least the outside diameter of the armature 73 would be made oversized as originally fabricated. This thus oversized armature is then case hardened as by a conventional carburize or carbonitride case hardening process to provide the hardened wear surfaces 90. In this embodiment all of the exposed surface areas of the armature would be case hardened. After case hardening, followed by a tempering procedure on the armature material, at least the outside peripheral surface of the armature and any other surface on which this case hardened material is not wanted is then ground down whereby the thin layer of case hardened material thereon is removed so as to expose the magnetically soft material from which the armature is fabricated. Thus, in particular, if the case hardened shell depth formed on the outside diameter of the armature is from 0.004–0.007 inch in thickness, then during grinding, preferably at least 0.010 inch minimum thickness of material is removed from the outside peripheral surface of the armature. This is done to insure that all of the case hardened material has been completely removed from this surface of the armature. Of course in this latter method it will be obvious that the outside diameter of the armature 73 is actually ground down to the desired, designed outside diameter dimension of the armature.

Figure 3:
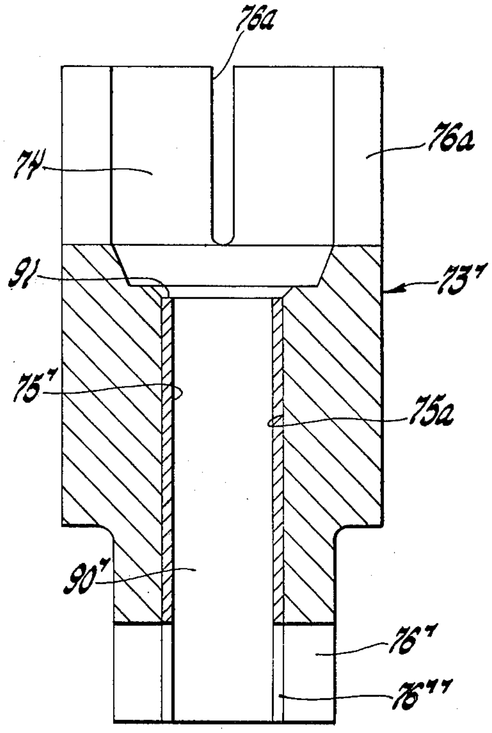

Referring now to FIG. 3 there is illustrated a further embodiment of an armature 73' having a hardened resistant surface material 90' in a selected location of the armature. In this embodiment the body of the armature 73' is provided initially with an oversized bore **75*a* and then a cylindrical tubular sleeve 91 of suitably hard wear resistant material is positioned in the bore 75*a* and secured thereto as by a press fit so as to provide a hardened wear surface 90'. As shown, the inside diameter of the sleeve is preselected so as to provide the guide bore 75' having a corresponding inside diameter to that of the wall of bore 75 whereby to slidably receive the lower end of the guide pin 72. Sleeve 91, which extends the full axial extent of the bore 75*a* is preferably provided at its lower end (FIG. 3) with a slot 76" aligned with the radial slot 76' in the armature 73'**.

From the above description it will now be apparent that with the armature-guide pin arrangement of the electromagnetic fuel injector shown, it is now possible to provide selected wear resistant surfaces on the critical surfaces of an armature that are subjected to wear whereby to permit increased operational durability of the injector without substantially affecting the desired magnetic property of the armature required to provide for optimum injector dynamic response characteristics.

The embodiments of the invention in which an exclusive property or privilege is claimed are defined as follows:

1. In an electromagnetic fuel injector of the type having a hollow tubular body with a stepped bore therethrough providing a fuel chamber therein intermediate its ends adapted to receive fuel, a fuel injector nozzle positioned in the stepped bore at one end of the body to define a spray tip at one end and an annular valve seat encircling a discharge passage upstream of the spray tip in communication with the fuel chamber, a valve positioned in the stepped bore for movement into and out of engagement with the valve seat, the valve being flat on one side thereof and being spherical opposite the flat to form a spherical seating surface for valve closing engagement with the valve seat, and a solenoid means including a stationary pole piece and a movable cylindrical armature for actuating the valve for controlling flow from the fuel chamber to the discharge passage; the improvement comprising a non-magnetic guide pin fixed to the pole piece to extend axially toward the valve seat substantially concentric therewith, the armature having a central axial guide bore therein of a diameter to slidably receive said guide pin whereby said armature is axially guided by said guide pin, and wherein at least the internal wall material of said armature defining said guide bore is wear resistant whereby frictional wear between said guide pin and said armature will be substantially reduced during extended operation of the electromagnetic fuel injector, at least the remainder of said armature in the magnetic circuit of the solenoid being of magnetically soft material.

2. In an electromagnetic fuel injector of the type having a hollow tubular body with a stepped bore therethrough providing a fuel chamber therein intermediate its ends adapted to receive fuel, a fuel injector nozzle positioned in the stepped bore at one end of the body to define a spray tip at one end and an annular valve seat encircling a discharge passage upstream of the spray tip in communication with the fuel chamber, a valve positioned in the stepped bore for movement into and out of engagement with the valve seat, and a solenoid means including a stationary pole piece and a movable armature operatively associated with the valve for controlling movement thereof; the improvement comprising a non-magnetic guide pin fixed to the pole piece to extend axially toward the valve seat substantially concentric therewith, the armature having a central axial guide bore therein of a diameter to slidably receive said guide pin whereby said armature is axially guided by said guide pin, and wherein the material of said armature circumferentially surrounding at least said bore and at least one end surface of said armature is wear resistant and the remainder of said armature is of magnetically soft material said wear resistant material being operative whereby frictional wear between said guide pin and said armature will be substantially reduced during extended operation of the electromagnetic fuel injector.

* * * * *